United States Patent
Wang et al.

(10) Patent No.: US 9,552,199 B2
(45) Date of Patent: Jan. 24, 2017

(54) METHOD AND APPARATUS OF PROMPTING AN UPDATE OF AN APPLICATION

(71) Applicant: Alibaba Group Holding Limited, Grand Cayman (KY)

(72) Inventors: Yan Wang, Beijing (CN); Li Wang, Beijing (CN)

(73) Assignee: Alibaba Group Holding Limited, Grand Cayman (KY)

(*) Notice: Subject to any disclaimer, the term of this patent is extended or adjusted under 35 U.S.C. 154(b) by 1 day.

(21) Appl. No.: 14/721,565

(22) Filed: May 26, 2015

(65) Prior Publication Data

US 2015/0347122 A1   Dec. 3, 2015

(30) Foreign Application Priority Data

May 27, 2014   (CN) .......................... 2014 1 0228341

(51) Int. Cl.
*G06F 9/445* (2006.01)
*G06F 11/34* (2006.01)
*G06F 9/44* (2006.01)
*G06F 11/00* (2006.01)
(Continued)

(52) U.S. Cl.
CPC . *G06F 8/65* (2013.01); *G06F 8/61* (2013.01); *G06F 8/67* (2013.01); *G06F 8/68* (2013.01); *G06F 11/004* (2013.01); *G06F 11/3409* (2013.01); *G06F 11/3466* (2013.01); *H04L 67/26* (2013.01); *G06F 2201/865* (2013.01)

(58) Field of Classification Search
CPC .............. G06F 8/61; G06F 8/65; G06F 8/665; G06F 8/68; G06F 8/67; G06F 11/3409; G06F 11/3466; G06F 11/004; G06F 9/44; G06F 2201/865; H04L 67/26
USPC .......................................................... 717/168
See application file for complete search history.

(56) References Cited

U.S. PATENT DOCUMENTS 8,255,902 B1 * 8/2012 Satish .................. G06F 11/008
                                                                   713/189
8,635,272 B2    1/2014 Reisman
(Continued)

OTHER PUBLICATIONS

PCT Search Report and Written Opinion mailed Aug. 17, 2015 for PCT application No. PCT/US2015/032429, 9 pages.

*Primary Examiner* — Viva Miller
(74) *Attorney, Agent, or Firm* — Lee & Hayes, PLLC (57) ABSTRACT

A method and apparatus of updating an application are disclosed. The method includes calculating an error probability of a designated application when running under one or more designated conditions in an event that the application includes updateable content, the one or more designated conditions including an attribute and/or a runtime environment of the application; and pushing an update prompt of the application to a terminal device that satisfies the one or more designated conditions in response to the error probability satisfying a preset condition. The embodiments of the present disclosure reduce the number and the frequency of pushing other unnecessary update prompts, reduce the consumption of resources of a server system, reduce the number and the frequency of responses of a terminal device with respect to the update prompts, and also decrease the consumption of system resources of the terminal devices.

12 Claims, 2 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 2003/0226059 A1* | 12/2003 | Braun | G06F 11/0748 |
| | | | 714/20 |
| 2004/0031030 A1* | 2/2004 | Kidder | G06F 1/14 |
| | | | 717/172 |
| 2004/0221284 A1 | 11/2004 | Costello et al. | |
| 2005/0262500 A1 | 11/2005 | Stanley | |
| 2006/0106806 A1* | 5/2006 | Sperling | G06F 8/65 |
| 2007/0192763 A1 | 8/2007 | Helvick | |
| 2007/0198698 A1 | 8/2007 | Boyd et al. | |
| 2008/0288935 A1* | 11/2008 | Kawaguchi | G06F 8/65 |
| | | | 717/172 |
| 2009/0276655 A1 | 11/2009 | Quere et al. | |
| 2012/0036498 A1* | 2/2012 | Akirekadu | G06F 11/3495 |
| | | | 717/124 |
| 2012/0158825 A1 | 6/2012 | Ganser | |
| 2012/0210310 A1 | 8/2012 | Cooley et al. | |
| 2012/0266155 A1* | 10/2012 | Valeriano | G06F 8/65 |
| | | | 717/172 |
| 2013/0152044 A1* | 6/2013 | Salecker | G06F 8/70 |
| | | | 717/120 |
| 2014/0047415 A1 | 2/2014 | Chatterjee | |
| 2014/0053135 A1* | 2/2014 | Bird | G06F 8/71 |
| | | | 717/124 |
| 2014/0059670 A1* | 2/2014 | Zheng | G06F 21/10 |
| | | | 726/17 |
| 2015/0074469 A1* | 3/2015 | Cher | G06F 11/008 |
| | | | 714/47.2 |

* cited by examiner

METHOD AND APPARATUS OF PROMPTING AN UPDATE OF AN APPLICATION

CROSS REFERENCE TO RELATED PATENT APPLICATION

This application claims foreign priority to Chinese Patent Application No. 201410228341.4 filed on May 27, 2014, entitled "Method and Apparatus of Prompting an Update of an Application", which is hereby incorporated by reference in its entirety.

TECHNICAL FIELD

The present disclosure relates to a field of communication technologies, and in particularly, to methods and apparatuses of updating and prompting an application.

BACKGROUND

Currently, with the rapid development of the Internet, network applications tend to be diversified. Especially, with the popularity of mobile devices, applications (Apps), such as instant communication tools, electronic mailboxes, web browsers, etc., have been widely used in various aspects of daily lives and work of people.

However, due to the increasingly intense competition in the application market and growing similarities in technologies among competitive application enterprises, the user experience has become a soft power in the competition of applications, which has become an index for evaluating whether a product is successful or not.

Moreover, in order to maintain the competitive power of an application, an improvement in functions of the application and an upgrade of a version of the application are performed frequently in order to enhance the user experience.

Generally, each time when a version of an application is upgraded, a prompt is sent to a terminal device (for example, a mobile device) where the application is installed for performing an update.

Firstly, frequent pushes of update prompts by an application publisher leads to a large consumption of system resources of a server of the publisher, and a terminal device also needs to respond to the update prompts frequently, which also consumes a large amount of system resources of the terminal device.

Secondly, such frequent update prompts disturb users severely, which leads to a very poor user experience.

Furthermore, due to the frequent update prompts, the users have to update the application to solve such perplexity, resulting in an update of a large number of applications, which occupies a large amount of network bandwidth.

Therefore, a current technical problem that needs to be solved urgently by one skilled in the art is: how to propose an update mechanism for an application to reduce the frequency of pushing update prompts, reduce the consumption of system resources of mobile devices and servers, reduce the occupancy of network bandwidth, and enhance the user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

A technical problem to be solved by the embodiments of the present disclosure is to provide a method of prompting an update for an application to reduce a frequency of pushing update prompts, reduce consumption system resources of mobile devices and servers, reduce occupancy of network bandwidth, and enhance user experience.

Correspondingly, the embodiments of the present disclosure further provide an apparatus of prompting an update for an application to ensure implementations and applications of the above method.

In order to solve the above problem, the embodiments of the present disclosure provide a method of updating an application, which includes:

when a designated application includes updateable content, calculating an error probability of the application when running under one or more designated conditions, each of the one or more designated conditions including an attribute, a runtime environment of the application, or both the attribute and the runtime environment; and when the error probability satisfies a preset condition, pushing an update prompt of the application to a terminal device that satisfies the one or more designated conditions.

In an embodiment, calculating the error probability of the application when running under the one or more designated conditions includes:

acquiring log information recorded in a terminal device to which the application belongs, the log information including error information of the application when running under the one or more designated conditions, and startup information of the application under the one or more designated conditions; and calculating a quantity ratio between the error information and the startup information to obtain the error probability of the application when running under the one or more designated conditions.

In an embodiment, the terminal device includes a mobile device.

In an embodiment, the attribute information of the application includes at least version information of the application.

The runtime environment information includes at least one of:

model information of the terminal device, operating system version information of the terminal device, and network information of the terminal device.

In an embodiment, pushing the update prompt of the application to the terminal device that satisfies the one or more designated conditions includes:

pushing the update prompt of the application to a preset number of terminal devices under the one or more designated conditions.

In an embodiment, pushing the update prompt of the application to the terminal device that satisfies the one or more designated conditions further includes:

when error probabilities of a preset number of applications running under the one or more designated conditions remain unchanged or increase, stopping pushing update prompts of the applications to target terminal devices; and when the error probabilities of the preset number of applications running under the one or more designated conditions decrease, pushing the update prompts of the applications to the target terminal devices;

wherein the target terminal devices are terminal devices satisfying the one or more designated conditions and being different from the preset number of terminal devices.

The embodiments of the present disclosure further provide an apparatus of updating an application, which includes:

a probability statistics module to calculate an error probability of a designated application when running under one or more designated conditions when the application includes updateable content, each of the one or more designated conditions including an attribute, a runtime environment of the application, or both the attribute and the runtime environment; and a prompt pushing module to push an update prompt of the application to a terminal device satisfying the one or more designated conditions when the error probability satisfies a preset condition.

In an embodiment, the probability statistics module includes:

a log information acquisition sub-module to acquire log information recorded in a terminal device to which the application belongs, the log information including error information of the application when running under the one or more designated conditions and startup information of the application under the one or more designated conditions; and a quantity ratio computation sub-module to calculate a quantity ratio between the error information and the startup information to obtain the error probability of the application when running under the one or more designated conditions.

In an embodiment, the terminal device includes a mobile device.

In an embodiment, the attribute of the application is represented by attribute information of the application, and the runtime environment is represented by runtime environment information, where the attribute information of the application includes at least version information of the application, and the runtime environment information includes at least one of: model information of the terminal device, operating system version information of the terminal device, and network information of the terminal device.

In an embodiment, the prompt pushing module includes:

a first pushing sub-module to push the update prompt of the application to a preset number of terminal devices under the one or more designated conditions.

In an embodiment, the prompt pushing module further includes:

a stop pushing sub-module to stop pushing the update prompt of the application to target terminal devices when error probabilities of a preset number of applications running under the one or more designated conditions remain unchanged or increase; and a second push sub-module to push the update prompt of the application to the target terminal devices when the error probabilities of the preset number of applications running under the one or more designated conditions decrease;

wherein the target terminal devices are terminal devices satisfying the one or more designated conditions and being different from the preset number of terminal devices.

Compared with existing technologies, the embodiments of the present disclosure have the following advantages:

The embodiments of the present disclosure computes an error probability of a designated application when running under one or more designated conditions when the application has updateable content, and push an update prompt of the application to terminal devices to which the application belongs under the one or more designated conditions when the error probability satisfies a preset condition, thus reducing the number and the frequency for pushing other unnecessary update prompts, reducing the consumption of system resources of a server, reducing the number and the frequency for the terminal devices to respond to the update prompts, and reducing the consumption of system resources of the terminal devices on the one hand. Moreover, a decrease in the number and the frequency of the update prompts can greatly improve the user experience. Furthermore, with the decrease in the update prompts, the number of application updates is also reduced, which reduces the occupancy of network bandwidth significantly. On the other hand, performing an update based on the error probability can effectively reduce the probability of an error (such as a crash, etc.) of the terminal device, enhance the stability of running the application, and thus further improve the user experience.

The embodiments of the present disclosure monitor an error probability of an updated application. If the error probability remains unchanged or increases, this indicates that the updated application may have new bugs/defects or may have not resolved previous bugs/defects yet, etc., and thus is not suitable for further promotion. Thus, the push of an update prompt to other terminal devices that satisfy one or more conditions may be stopped, which further reduces the number and the frequency of the update prompts, the consumption of the system resources of the server and the terminal devices, and the occupancy of the network bandwidth. If the error probability decreases, this indicates that problems such as previous bugs/defects, etc., have been resolved in the updated application, and thus the application is suitable for promotion. Thus, the push of the update prompt to other terminal devices satisfying the one or more conditions will continue, which ensures the validity of the application, enhances the efficiency for pushing the update prompts of the application, and further enhances the efficiency of updating the application.

DETAILED DESCRIPTION

In order to make the above objectives, characteristics, and advantages of the present disclosure more apparent and easy to understand, the present disclosure will be described in further details below in conjunction with the accompanying drawings and exemplary implementations.

Figure 1:
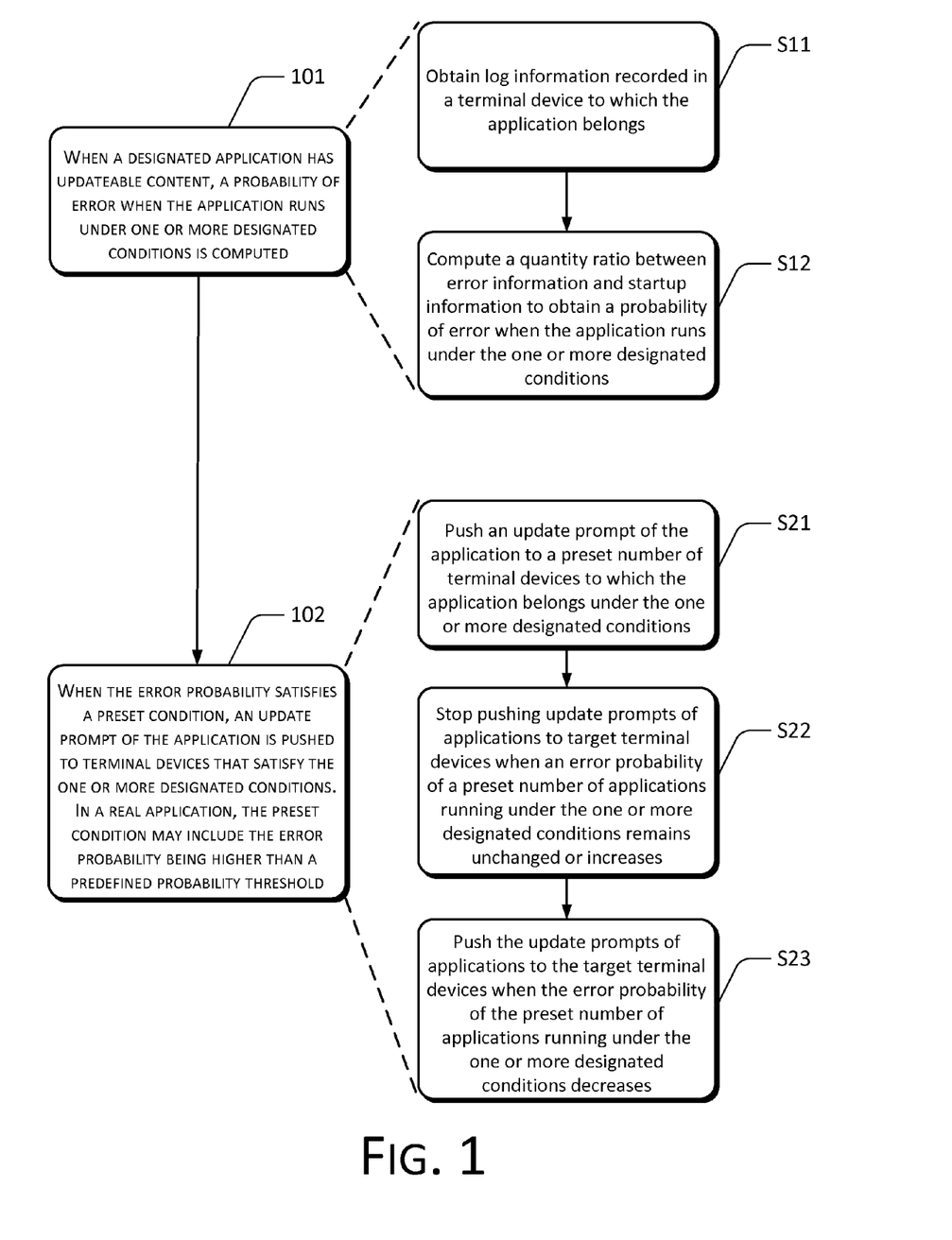
FIG. 1 is a flowchart of an example method of prompting an update of an application according to the present disclosure.

FIG. 1 shows a flowchart of an example method of prompting an update of an application according to the present disclosure, which may include the following:

At 101, when a designated application has updateable content, a probability of error when the application runs under one or more designated conditions is computed.

In an embodiment of the present disclosure, the application may correspond to a computer program that is developed to complete one or more functions and run on an operating system, for example, an instant communication tool used for instant communication, an electronic mailbox used for sending and receiving electronic mails, a web browser used for browsing web pages, etc.

The updateable content may include a new version of the application, a patch, etc. The embodiment of the present disclosure has not imposed any limitation thereon.

In a real application, an error, such as a crash, usually occurs in the application. This is especially true in mobile devices. For example, an application in a mobile device may suddenly be crashed when online shopping is conducted, the application may get stuck and needs to be shut off and re-booted, or the mobile device may be crashed. As can be seen, a crash is a main factor that affects the stability of running of the application, and also severely influences user experience. Therefore, a developer needs to timely fix the errors of the application, such as a crash, to reduce an error probability of the application.

In an embodiment of the present disclosure, block 101 may include the sub-blocks:

Sub-block S11 obtains log information recorded in a terminal device to which the application belongs.

The log information may include error information of the application when running under one or more designated conditions, and startup information of the application under the one or more designated conditions.

In a specific implementation, the one or more designated conditions may include an attribute, a runtime environment of the application, or both the attribute and the runtime environment. The attribute of the application may be represented by attribute information of the application, and the runtime environment may be represented by runtime environment information.

In an embodiment of the present disclosure, the terminal device may include a mobile device, for example, a tablet computer, Personal Digital Assistant, a cell phone, etc. Since internal memory, hard disk, and CPU (Central Processing Unit), etc., of a mobile device may influence a running status of the application, and an operating system (e.g., Android, IOS, Windows Phone, etc.) is not very perfect either, errors such as a crash may often appear in the mobile device.

Apparently, the terminal device may also include an electronic computer, a smart television, etc. The embodiment of the present disclosure does not impose any limitation thereon.

In an embodiment of the present disclosure, the attribute information of the application may at least include version information of the application.

The runtime environment information may include at least one of: model information of the terminal device, operating system version information of the terminal device, and network information of the terminal device.

In a real application, an error probability of an application is closely related to four designated conditions such as, a version of the application, model information of a terminal device, operating system version information of the terminal device, and network mode information of the terminal device. The version of the application, the model information of the terminal device, the operating system version information of the terminal device, and the network mode information of the terminal device are important factors that affect the error probability of the application.

Each update of the version of the application may involve modifications to internal codes. Functions and performance in each version of the application may vary, and not every aspect can be taken into account at the beginning of the design of the application. As such, many factors that cause errors, such as a crash, exist.

For different models of terminal devices, especially mobile devices, hardware devices thereof are different, and differences in sizes of internal memory and hard disk may cause different probabilities of error (e.g., a crash) of an application. Different occupancy rates of a CPU may also cause different probabilities of error (e.g., a crash) of the application.

Different versions of operating systems, especially operating systems in mobile devices, come in a large number and are widely different. For example, for an IOS operating system, a difference in version may cause a different degree of fusion with program codes of an application. For example, a change in an invocation interface in an operating system may cause an error in invoking a low version of an application, and cause an error, such as a crash, of the application. For another example, for an Android operating system, due to an open source characteristic, a number of operating systems are developed and derived from Android. Although a bottom layer of these operating systems is Android, different interfaces exist in different operating systems, which causes a compatibility problem and is prone to an error, such as a crash, of the application.

The network information of the terminal device may include one or more types of information regarding a network connection mode (e.g., wired connection or wireless connection), a network signal strength, and a network type (a network standard type, such as CDMA (wireless communication network), GPRS (a communication technology using spread spectrum), etc.). Due to the use of the application, the terminal device often needs to connect to a network, and a region where a user usually stays is relatively fixed, for example, a workplace, a place of residence, etc. Due to issues such as a coverage scope of base stations and a signal interference, etc., the network linked to the terminal device may have problems such as a weak signal, a low networking speed, etc. A network having a weak signal may cause more errors of the application such as a crash. The low networking speed may also cause more errors of the application such as crashes. However, the weak signal and the low networking speed are relatively common in a network to which the mobile device is connected.

Apparently, the above designated conditions are only examples for illustration. When implementing the embodiments of the present disclosure, other designated conditions may be set up based on real situations, for example, applications incompatible with a current application, a duration for a single run, etc. The embodiments of the present disclosure do not impose any limitations thereon. In addition, besides the above designated conditions, one skilled in the art may further adopt other designated conditions according to actual situations, which are not limited by the embodiments of the present disclosure.

By applying the embodiments of the present disclosure, program codes (that is, a buried point) that may record and return information such as an attribute (e.g., version information of an application, etc.), runtime environment (e.g., model information of a terminal device, operating system version information of the terminal device, network mode information of the terminal device, etc.) of the application, or both the attribute and the runtime environment may be embedded in the application in advance. In response to an occurrence of an abnormal signal when the application is running, a system of the terminal device may send the abnormal signal to the application. Upon listening the abnormal signal, the application may invoke an API (Application Programming Interface) corresponding to the buried point. The buried point may be executed via the API to record current log information. The log information contains an attribute (e.g., version information of the application, etc.) and/or a runtime environment (e.g., model information of the terminal device, operating system version information of the terminal device, or network information of the terminal device, etc.) of the application when the application runs abnormally. Furthermore, stacktrace information (that is, information related to a reason why an abnormal run of the application occurs) may also be collected, and written into the log information using the API. Upon receiving the abnormal signal, the application exits from running in response to the abnormal signal.

In addition, a usage log of the application may also be recorded in the log information. For example, when the application is started, a piece of log information is recorded.

The server may actively collect the log information through the buried point in the application when an error occurs in the application. Alternatively, the terminal device may upload the log information into the server using the buried point under designated situations (e.g., at regular intervals, when the log information exceeds a certain amount, when the mobile device is powered off, or when the application is shut off, etc.), which the embodiments of the present disclosure do not impose any limitations thereon.

Sub-block S12 computes a quantity ratio between error information and startup information to obtain a probability of error when the application runs under the one or more designated conditions.

The server may perform a data analysis on the stored log information to obtain the error probability.

For computing statistics of an error probability under a single designated condition, for example, computing an error probability under a certain designated model of a terminal device, a number A of pieces of error information for each piece of information carrying the model information of the terminal device may be counted, and a number B of pieces of information for the application starting up on the terminal devices of this model may be counted. The error probability under a condition of this model is equal to the number A of pieces of error information divided by the number B of pieces of startup information.

For computing statistics of an error probability under a complex designated condition (that is, a plurality of designated conditions), computation of an error probability of an application under designated conditions associated with a version of the application, a model of a terminal device and an operating system version of the terminal device is used as an example for illustration. For example, the version of the designated application is 1.1.20140101, the model of the terminal device is X, and the operating system version of terminal device is Android 4.4. A number C of pieces of error information having the application version information as 1.1.20140101, the model information of the terminal device as X, and the operating system version information of the terminal device as Android 4.4 may be counted. A number D of pieces of startup information of the application is counted. Then, an error probability of the application under the above designated conditions of the version of the application, the model of terminal device, and the operating system version of terminal device is equal to the number C of pieces of error information/the number D of pieces of startup information.

At 102, when the error probability satisfies a preset condition, an update prompt of the application is pushed to terminal devices that satisfy the one or more designated conditions. In a real application, the preset condition may include the error probability being higher than a predefined probability threshold.

When the preset condition is employed, an error probability under a single designated condition is scanned first. If the probability threshold is exceeded, such single designated condition may be used, and associated users with the designated condition being satisfied are prompted to update the application. If the probability threshold is not exceeded under the single condition, an error probability under a complex designated condition is scanned. If the probability threshold is exceeded, the complex designated condition may be used, and associated users with the complex condition being satisfied are prompted to update the application.

It should be noted that the embodiments of the present disclosure may use any one, two, three or four of the designated conditions. The embodiments of the present disclosure do not impose any limitations thereon.

The preset condition may also include one or more error probabilities that are positioned at the topmost of a ranking order under the one or more designated conditions.

When the preset condition is employed, the update prompt of the application may be pushed to one or more terminal devices satisfying the one or more designated conditions and having the highest error probability.

Furthermore, one skilled in the art may further set other preset conditions according to actual situations, which are not limited by the embodiments of the present disclosure.

The update prompt may be a text prompt message, a picture prompt message, a sound prompt message, and so on, which is not limited by the embodiments of the present disclosure.

For example, an application has some design defects, such that an error probability of the application on a terminal device of a certain model is relatively high. A new version of the application is mainly launched to repair such design defects. In this case, detection may be made as to which model of the terminal device the current application has a high error probability. The error probability may be higher than a preset probability threshold, so that an update prompt of the application may be pushed to terminal devices having a relatively higher error probability.

Error probabilities of an application for each terminal device may be represented in the following table:

| Model Information of Terminal device | Error Probability |
|---|---|
| Model A | 1% |
| Model B | 10% |
| Model C | 4% |
| Model D | 3.5% |

Under a single designated condition, the probability threshold may be set at a higher level. Assuming that the probability threshold is 5%, an update prompt of the application A may be pushed to terminal devices corresponding to Model B, and not to terminal devices corresponding to Model A, Model C and Model D to avoid unnecessary updates in the above example.

For another example, the application in Version 5.7 has a bug, so that an error probability is relatively high when GPRS (wireless network communications) is used for networking in a terminal device which operating system is Android 2.2.3 and which model is Model B. A new version of the application is mainly launched to repair the bug occurred in the terminal device of Model B and version Android 2.2.3 to reduce the error probability during the use of GPRS for networking. In this case, a terminal device satisfying a combination of conditions and having a relatively high error probability of the application may be detected by using the designated conditions—the version information of the application, the model information of the terminal device, the operating system version information of the terminal device and the networking mode information of the terminal device.

Error probabilities of an application under different complex conditions may be represented in the following table:

| Version Information of Application | Model Information of Terminal Device | Operating System Version Information of Terminal Device | Network Type of Terminal Device | Error Probability |
|---|---|---|---|---|
| 5.7 | Model A | Android 2.2.3 | CDMA | 1% |
| 5.7 | Model B | Android 2.2.3 | GPRS | 3% |
| 5.6 | Model C | Android 2.3.4 | GPRS | 0.1% |

Under the complex designated condition, the probability threshold may be set at a lower level. Assuming that the probability threshold is 2%, an update prompt of the application may be pushed to terminal devices installed with the application in Version 5.7, running an operating system of Android 2.2.3 and using a GPRS communication protocol, and not to other terminal devices.

The embodiments of the present disclosure computes an error probability of a designated application when running under one or more designated conditions when the application has updateable content, and push an update prompt of the application to terminal devices to which the application belongs under the one or more designated conditions when the error probability satisfies a preset condition, thus reducing the number and the frequency for pushing other unnecessary update prompts, reducing the consumption of system resources of a server, reducing the number and the frequency for the terminal devices to respond to the update prompts, and reducing the consumption of system resources of the terminal devices on the one hand. Moreover, a decrease in the number and the frequency of the update prompts can greatly improve the user experience. Furthermore, with the decrease in the update prompts, the number of application updates is also reduced, which reduces the occupancy of network bandwidth significantly. On the other hand, performing an update based on the error probability can effectively reduce the probability of an error (such as a crash, etc.) of the terminal device, enhance the stability of running the application, and thus further improve the user experience.

In an embodiment of the present disclosure, block 102 may include the following sub-blocks:

Sub-block S21 pushes an update prompt of the application to a preset number of terminal devices to which the application belongs under the one or more designated conditions.

In a specific implementation, a number m (m is a positive number, and m≤100) is set up. When an application needs to be updated, an update prompt of the application is pushed to m % of terminal devices that satisfy the one or more designated conditions.

It should be noted that the number m may be set up by one skilled in the art according to actual situations. For example, the number m may be set to be one hundred by default. In other words, an update prompt of the application is pushed to all terminal devices satisfying the one or more designated conditions by default.

In an embodiment of the present disclosure, block 102 may further include the following sub-blocks:

Sub-block S22 stops pushing update prompts of applications to target terminal devices when an error probability of a preset number of applications running under the one or more designated conditions remains unchanged or increases.

Sub-block S23 pushes the update prompts of applications to the target terminal devices when the error probability of the preset number of applications running under the one or more designated conditions decreases.

The target terminal devices are terminal devices satisfying the one or more designated conditions and different from the preset number of terminal devices.

By applying the embodiments of the present disclosure, after an application is updated for a period of time, the server may actively collect log information by a buried point of a terminal device, or the terminal device may upload the log information to the server using the buried point under a designated situation (for example, at regular intervals, when the mobile device is powered off, or when the application is shut off, etc.). By using the log information, the server calculates an error probability of the updated application within such period of time, and makes a comparison with the error probability of the application before the update.

The embodiments of the present disclosure monitor an error probability of an updated application. If the error probability remains unchanged or increases, this indicates that the updated application may have new bugs/defects or may have not resolved previous bugs/defects yet, etc., and thus is not suitable for further promotion. Thus, the push of an update prompt to other terminal devices that satisfy one or more conditions may be stopped, which further reduces the number and the frequency of the update prompts, the consumption of the system resources of the server and the terminal devices, and the occupancy of the network bandwidth. If the error probability decreases, this indicates that problems such as previous bugs/defects, etc., have been resolved in the updated application, and thus the application is suitable for promotion. Thus, the push of the update prompt to other terminal devices satisfying the one or more conditions will continue, which ensures the validity of the application, enhances the efficiency for pushing the update prompts of the application, and further enhances the efficiency of updating the application.

It should be noted that the method embodiments are described as a combination of a series of actions for the sake of description. However, one skilled in the art should understand that the embodiments of the present disclosure are not limited by the order of the actions as described above because some method blocks may be performed in a different order or performed at the same time according to the embodiments of the present disclosure. Furthermore, one skilled in the art should also understand that the embodiments described in this specification all correspond to exemplary embodiments, and actions involved therein may not be essential for the embodiments of the present disclosure.

Figure 2:
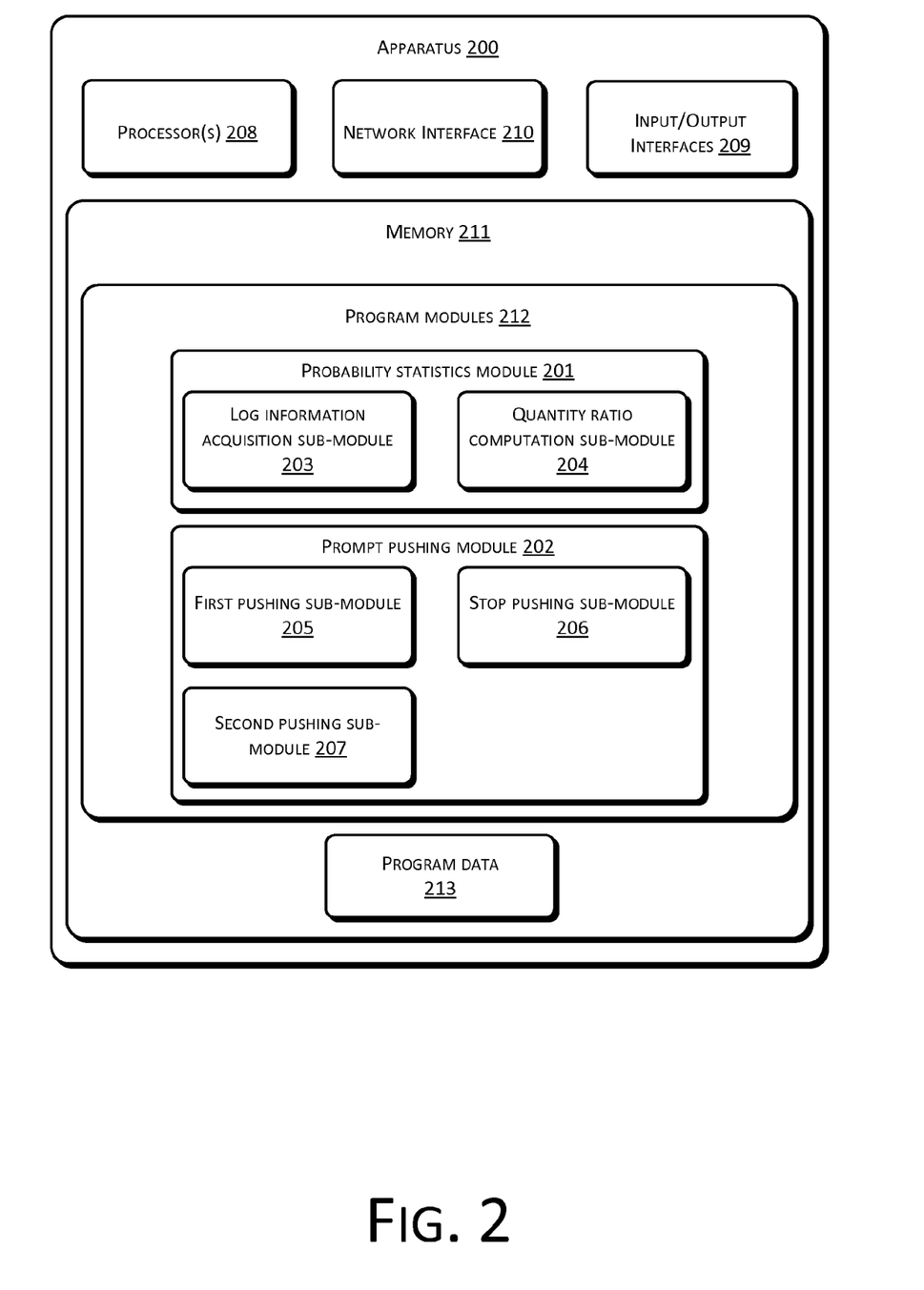
FIG. 2 is a structural diagram of an example apparatus of prompting an update of an application according to the present disclosure.

FIG. 2 shows a structural diagram of an example apparatus 200 of prompting for an update of an application according to the present disclosure, which may include the following modules:

a probability statistics module 201 to calculate an error probability of a designated application when running under one or more designated conditions when the application includes updateable content, each of the one or more designated conditions including an attribute, a runtime environment of the application, or both the attribute and the runtime environment; and a prompt pushing module 202 to push an update prompt of the application to a terminal device satisfying the one or more designated conditions when the error probability satisfies a preset condition.

In an embodiment of the present disclosure, the probability statistics module 201 may include:

a log information acquisition sub-module 203 to acquire log information recorded in a terminal device to which the application belongs, the log information including error information of the application when running under the one or more designated conditions and startup information of the application under the one or more designated conditions; and a quantity ratio computation sub-module 204 to calculate a quantity ratio between the error information and the startup information to obtain the error probability of the application when running under the one or more designated conditions.

In an embodiment of the present disclosure, the terminal device may include a mobile device.

In an embodiment of the present disclosure, the attribute of the application may be represented by attribute information of the application, and the runtime environment may be represented by runtime environment information.

The attribute information of the application includes at least version information of the application.

The runtime environment information includes at least one of: model information of the terminal device, operating system version information of the terminal device, and network information of the terminal device.

In an embodiment of the present disclosure, the prompt pushing module 202 may include:

a first pushing sub-module 205 to push the update prompt of the application to a preset number of terminal devices under the one or more designated conditions.

In an embodiment of the present disclosure, the prompt pushing module 202 may include:

a stop pushing sub-module 206 to stop pushing the update prompt of the application to target terminal devices when error probabilities of a preset number of applications running under the one or more designated conditions remain unchanged or increase; and a second push sub-module 207 to push the update prompt of the application to the target terminal devices when the error probabilities of the preset number of applications running under the one or more designated conditions decrease, where the target terminal devices are terminal devices satisfying the one or more designated conditions and being different from the preset number of terminal devices.

In an embodiment, the apparatus 200 may include one or more computing devices. For example, the apparatus 200 includes one or more processors (CPU) 208, an input/output interface 209, a network interface 210 and memory 211. The memory 211 may be a form of computer readable media, e.g., a non-permanent storage device, random-access memory (RAM) and/or a nonvolatile internal storage, such as read-only memory (ROM) or flash RAM. The memory is an example of computer readable media. The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 211 may include program modules 212 and program data 213. The program modules 212 may include the probability statistics module 201 and the prompt pushing module 202, as described in the foregoing description.

For the apparatus embodiments, due to their similarities to the method embodiments, a description thereof is relatively simple. Related parts may be referenced to corresponding parts of the method embodiments.

Each embodiment in the specification is described in a progressive manner. Emphasis of each embodiment is different from other embodiments, and the same or similar part of each embodiment can be referenced with each other.

One skilled in the art should understand that the embodiments of the present disclosure can be provided as a method, an apparatus or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The present disclosure is described in accordance with flowcharts and/or block diagrams of the exemplary methods, terminal apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing terminal device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing terminal device.

Such computer program instructions may also be stored in a computer readable memory device which may cause a computer or another programmable data processing mobile apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing terminal apparatus, so that a series of operations may be executed by the computer or the other data processing terminal apparatus to generate a computer implemented process. Therefore, the instructions executed by the computer or the other programmable apparatus may be used to implement one or more processes of the flowcharts and/or one or more blocks of the block diagrams.

Although the exemplary embodiments of the present disclosure have been described herein, one skilled in the art can make changes and modifications to these embodiments after understanding the fundamental creative concept of the present disclosure. The claims attached herein intend to include the exemplary embodiments and all changes and modifications covered by the embodiments of the present disclosure.

Finally, it should be noted that terms such as "first" and "second" are only used for differentiating an entity or operation from another entity or operation, but do not necessarily request or imply any existence of this type of real relationship or ordering between the entities or operations. Moreover, terms such as "comprise", "include" or any other variations thereof are meant to cover the non-exclusive inclusions. The process, method, product or terminal apparatus that includes a series of elements not only includes those elements, but also includes other elements that are not explicitly listed, or further includes elements that already existed in such process, method, product or terminal apparatus. In a condition without further limitations, an element defined by the phrase "include a/an . . . " does not exclude any other similar elements from existing in the process, method, product or terminal apparatus.

Detailed descriptions of a method and an apparatus of providing an update prompt of an application in accordance with the present disclosure have been described above. The specification explains the principles and implementations of the present disclosure using specific embodiments. The foregoing embodiments are merely used for helping to understand the methods and core concepts of the present disclosure. Also, based on the concepts of the present disclosure, one of ordinary skill in the art may change specific implementations and scope of applications. In short, the present specification shall be not construed as limitations to the present disclosure.

The invention claimed is:

1. A method implemented by one or more computing devices, the method comprising:
    calculating an error probability of an application when running under one or more designated conditions, the one or more designated conditions including at least one of an attribute or a runtime environment of the application, wherein calculating the error probability of the application comprises:
        acquiring log information recorded in one or more terminal devices to which the application belongs, the log information including error information of the application when running under the one or more designated conditions, and startup information of the application under the one or more designated conditions; and
        calculating a quantity ratio between the error information and the startup information to obtain the error probability of the application when running under the one or more designated conditions;
    pushing an update prompt of the application to a terminal device that has installed the application in response to the error probability being higher than a preset probability threshold; and
    determining whether to push or stop pushing the update prompt of the application to one or more target terminal devices based at least in part on a new error probability of the application running under the one or more designated conditions after an update, the one or more target terminal devices including terminal devices that satisfy the one or more designated conditions and are different than the terminal device, wherein the update prompt of the application is pushed to the one or more target terminal devices if the new error probability decreases, and the update prompt of the application is stopped from pushing to the one or more target terminal devices if the new error probability remains unchanged or increases.

2. The method of claim 1, wherein the terminal device includes a mobile device, a computer, or a smart television.

3. The method of claim 1, wherein information of the attribute of the application includes at least version information of the application, and information of the runtime environment includes at least one of model information of the terminal device, operating system version information of the terminal device, or network information of the terminal device.

4. The method of claim 1, further comprising pushing the update prompt of the application to a preset number of terminal devices under the one or more designated conditions.

5. An apparatus comprising:
    one or more processors;
    memory;
    a probability statistics module stored in the memory and executable by the one or more processors to calculate an error probability of an application when running under one or more designated conditions, the one or more designated conditions including at least one of an attribute or a runtime environment of the application, wherein calculating the error probability of the application comprises:
        acquiring log information recorded in one or more terminal devices to which the application belongs, the log information including error information of the application when running under the one or more designated conditions, and startup information of the application under the one or more designated conditions; and
        calculating a quantity ratio between the error information and the startup information to obtain the error probability of the application when running under the one or more designated conditions;
    a prompt pushing module stored in the memory and executable by the one or more processors to push an update prompt of the application to a terminal device that has installed the application when the error probability being higher than a preset probability threshold, and determine whether to push or stop pushing the update prompt of the application to one or more target terminal devices based at least in part on a new error probability of the application running under the one or more designated conditions after an update, the one or more target terminal devices including terminal devices that satisfy the one or more designated conditions and are different than the terminal device, wherein the update prompt of the application is pushed to the one or more target terminal devices if the new error probability decreases, and the update prompt of the application is stopped from pushing to the one or more target terminal devices if the new error probability remains unchanged or increases.

6. The apparatus of claim 5, wherein the terminal device includes a mobile device, a computer, or a smart television.

7. The apparatus of claim 5, wherein the attribute of the application is represented by attribute information of the application, and the runtime environment is represented by runtime environment information, and wherein the attribute information of the application comprises at least version information of the application, and the runtime environment information comprises at least one of: model information of the terminal device, operating system version information of the terminal device, and network information of the terminal device.

8. The apparatus of claim 5, wherein the prompt pushing module includes a first pushing sub-module to push the update prompt of the application to a preset number of terminal devices under the one or more designated conditions.

9. One or more computer-readable media storing executable instructions that, when executed by one or more processors, cause the one or more processors to perform acts comprising:
    calculating an error probability of an application when running under one or more designated conditions, the one or more designated conditions including at least one of an attribute or a runtime environment of the application, wherein calculating the error probability of the application comprises:
        acquiring log information recorded in one or more terminal devices to which the application belongs, the log information including error information of the application when running under the one or more designated conditions, and startup information of the application under the one or more designated conditions; and
        calculating a quantity ratio between the error information and the startup information to obtain the error probability of the application when running under the one or more designated conditions;
    pushing an update prompt of the application to a terminal device that has installed the application in response to the error probability being higher than a preset probability threshold; and
    determining whether to push or stop pushing the update prompt of the application to one or more target terminal devices based at least in part on a new error probability of the application running under the one or more designated conditions after an update, the one or more target terminal devices including terminal devices that satisfy the one or more designated conditions and are different than the terminal device, wherein the update prompt of the application is pushed to the one or more target terminal devices if the new error probability decreases, and the update prompt of the application is stopped from pushing to the one or more target terminal devices if the new error probability remains unchanged or increases.

10. The one or more computer-readable media of claim 9, wherein the terminal device includes a mobile device, a computer, or a smart television.

11. The one or more computer-readable media of claim 9, wherein the attribute of the application includes at least version information of the application, and information of the runtime environment includes at least one of model information of the terminal device, operating system version information of the terminal device, or network information of the terminal device.

12. The one or more computer-readable media of claim 9, the acts further comprising pushing the update prompt of the application to a preset number of terminal devices under the one or more designated conditions.

* * * * *